United States Patent [19]

Koff

[11] 4,090,310

[45] May 23, 1978

[54] CENTRIFUGE FOR DRYING SALAD GREENS AND THE LIKE

[76] Inventor: William Koff, 2100 S. Ocean La., Ft. Lauderdale, Fla. 33316

[21] Appl. No.: 768,084

[22] Filed: Feb. 14, 1977

[51] Int. Cl.² ............................................. F26B 17/24
[52] U.S. Cl. ......................................... 34/58; 99/479; 99/355; 233/1 R; 210/360 R
[58] Field of Search ................... 34/8, 58; 210/360 R; 99/479, 410, 355; 233/1 B, 1 R, 2, 14 R, 24, 27

[56] References Cited

U.S. PATENT DOCUMENTS

| 1,775,048 | 9/1930 | Papworth | 210/360 R |
| 1,997,621 | 4/1935 | Adsit et al. | 34/58 |
| 2,655,023 | 10/1953 | Blide et al. | 210/360 R |
| 3,885,321 | 5/1975 | Fouineteau | 34/58 |

FOREIGN PATENT DOCUMENTS

| 184,900 | 7/1955 | Germany | 34/58 |

*Primary Examiner*—Kenneth W. Sprague
*Assistant Examiner*—James C. Yeung
*Attorney, Agent, or Firm*—Ernest H. Schmidt

[57] ABSTRACT

A food damp drying centrifuge for commercial use comprises a rollably supported cylindrical housing, removably supported within which is a cylindrical food spinner basket. A drive motor affixed to the underside of the housing has a drive shaft extending through the housing bottom and terminating in an octagonal drive head interconnectably receivable within a complementary recess integrally formed in the underside of the spinner basket. A pair of mutually coaxially journalled, separable cover members cover and enclose the housing and spinner basket, respectively, for placing the centrifuge in condition for centrifuging food placed in the spinner basket upon energization of the drive motor.

7 Claims, 3 Drawing Figures

U.S.Patent  May 23, 1978  4,090,310

CENTRIFUGE FOR DRYING SALAD GREENS AND THE LIKE

This invention relates to food processing as directed particularly to a novel and improved centrifuge for drying salad greens and other foods in commercial food service establishments such as restaurants, cafeterias and the like.

It is the principal object of this invention to provide a salad greens centrifuge for commercial use, which, in addition to functioning as a dryer, comprises a dryer basket of such shape and design as to serve additionally as a container for the transportation, refrigeration and storage of food stuff to be dried or already dried, thereby minimizing rehandling and repacking of the food during the initial time of washing to the time of consumption.

Various types of centrifuges have heretofore been devised for damp-drying washed salad greens or the like foodstuffs in preparation prior to serving. Such drying apparatus heretofore devised, however, are deficient in various respects, principally that they are either of too small capacity to be useful anywhere other than in the home or, if of greater capacity, subject to mechanical failure under vibrational stress. Because of the complexity of previous commercial salad dryers, moreover, repair and maintenance has been so expensive and time consuming that they have gained only limited acceptance in the trade.

It is, accordingly, the principal object of this invention to provide a novel and improved salad greens centrifuge for commercial use that obviates the deficiencies of centrifuges heretofore devised.

A more particular object is to provide a food handling system which provides for the drying, transportation, refrigeration, and storage from the point of washing to the point of consumption without rehandling, repacking or the use of additional equipment during the entire process.

Another object of the invention is to provide a centrifuge of the above nature wherein the load imposed in the spinner basket by the foodstuff to be dried will be self-balancing without the use of complex and expensive compensating mechanism.

Another object of the invention is to provide a centrifugal drying device of the above nature wherein the spinner basket has a flat bottom and is devoid of center posts or the like, whereby centrifuging will be effected without undue vibration or brusing of the foodstuff, and whereby the spinner basket can serve as a flat-bottomed container for food storage, washing, refrigeration and transport independently of its use in centrifuging.

Another object of the invention is to provide a commercial foodstuff drying centrifuge of the above nature including a novel and improved drop-in interconnection means between the spinner basket and the motor drive mechanism whereby assembly of the spinner basket for centrifuging can be simply effected and wherein positive drive without slippage is assured.

Another object of the invention is to provide a centrifuge device of the above nature wherein the mutually journalled housing and spinner basket covers can easily be disassembled for separate use of the spinner basket cover with the spinner basket independently of the rest of the centrifuge, and to facilitate cleaning.

Yet another object of the invention is to provide a centrifuge of the character described which will be simple in construction, devoid of intricacies, crevices and the like such as might present difficulties in cleaning and sterilization, and which will be compact, attractive in appearance, dependable in operation and durable in use.

Other objects, features and advantages will be apparent from the following description when read with reference to the accompanying drawings. In the drawings, wherein like reference numerals denote corresponding parts throughout the several views.

Figure 1:
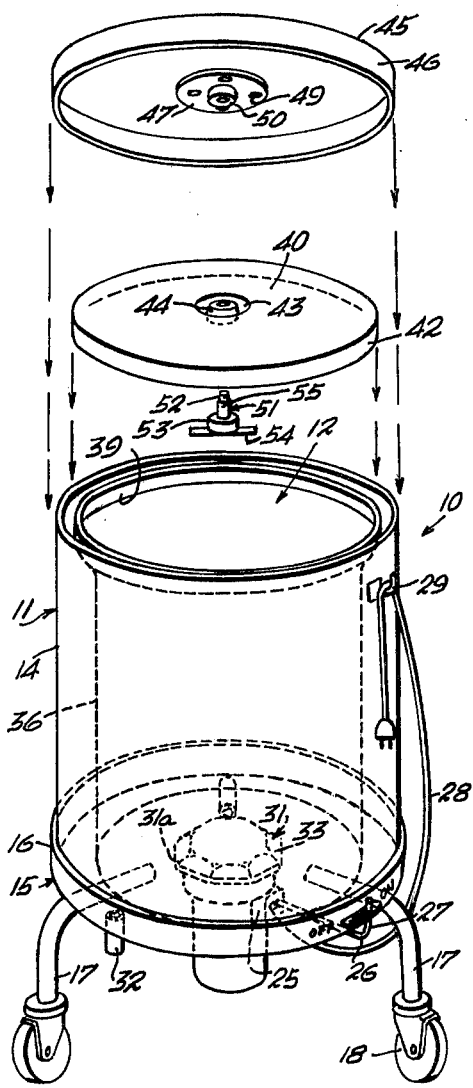
FIG. 1 is an exploded oblique view, as seen from above, of a centrifuge embodying the invention.

Referring now in detail to the drawings, reference numeral 10 designates a food drying centrifuge embodying my invention, the same comprising, generally, a housing assembly 11, a spinner basket 12 and a cover assembly 13.

The housing assembly 11 comprises a cylindrical body member 14 which will preferably be fabricated of rolled and seamed sheet metal, such as stainless steel, open at its upper end and closed at its lower end as by a stainless steel pan 15 having an upwardly-extending peripheral flange or skirt 16 within which said cylindrical body member is seated and sealed as by welding. Alternatively, the body member 14 could be molded of a tough synthetic plastic material.

Means is provided for rollably supporting the housing assembly 11 for portability. To this end, the underside of the bottom pan 15 has secured thereagainst plurality of right-angular legs 17, three in the embodiment illustrated, spaced 120 circular degrees each from the other. The legs 17 will preferably be comprised of bent metal tubing, and carry castor wheels 18 at their lower ends.

Means is provided for disconnectably, rotatably driving the spinner basket 12 within the housing assembly 11. To this end, a metal reinforcement plate 19, welded or otherwise secured against the underside of the body member pan 15, has secured thereto, as by bolts 20, an electric drive motor 21. The reinforcing plate 19 and electric drive motor 21 are so positioned that the motor drive shaft 22 extends through a central opening 23 in said pan so that the axis of rotation of said motor drive shaft 22 is coincident with the longitudinal axis of the cylindrical body member 14 of the housing assembly 11. As is hereinafter more particularly described, the electric drive motor 21 has a rotary speed of about 350 to 550 RPM, and may be provided with self-contained gear reduction mechanism to achieve such speed.

As means for preventing the leakage of drainage water through the motor drive shaft opening 23 in the pan 15, the inside of said pan has welded thereto, in surrounding relation with respect to said opening, a short tubular member 24. Spaced between the outer periphery of the motor drive shaft 22 and the inner wall of the tubular member 24 is a short length of plastic tubing 24a, which serves as supplementary journalling means for said drive shaft and which also has a quieting effect upon operation of the centrifuge.

An electrical switch box 25 secured against the side wall of the drive motor 21 (see FIG. 1) has a radially-outwardly-projecting switch lever arm 26 terminating in upwardly-extending manual control lever 27 adjacent the outside of the peripheral flange 16 for manually turning the drive motor on or off. An electrical cord 28 extending from the electrical switch box 25 serves to energize the drive motor upon plug-in-connection to a standard electrical receptacle. As further illustrated in FIG. 1, a hook member 29 secured against the outside of the cylindrical body member 14, near the upper end thereof, provides means for supporting the electrical cord 28 when the centrifuge is not in use.

Figure 2:
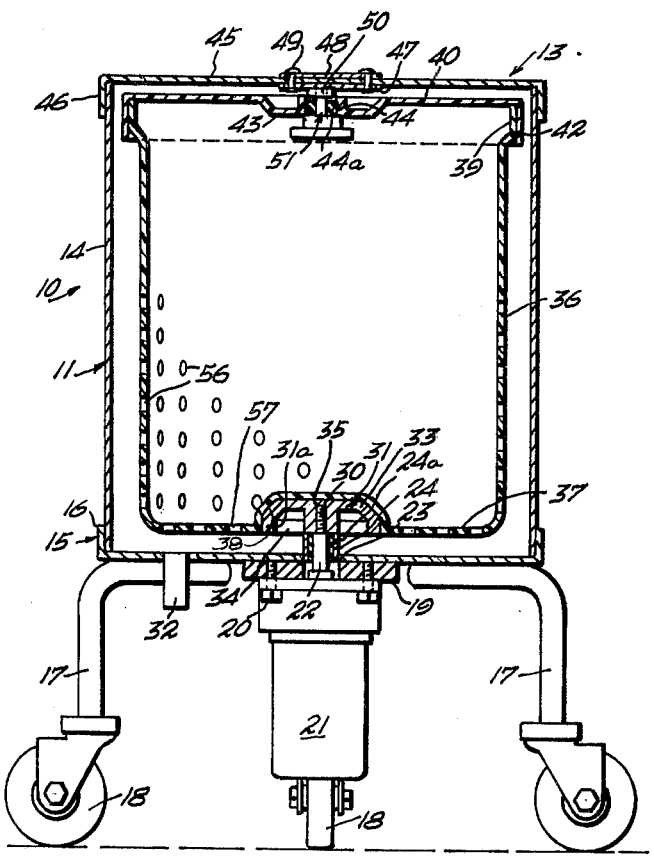
FIG. 2 is an elevational view, partly in vertical cross-section, thereof.
Figure 3:
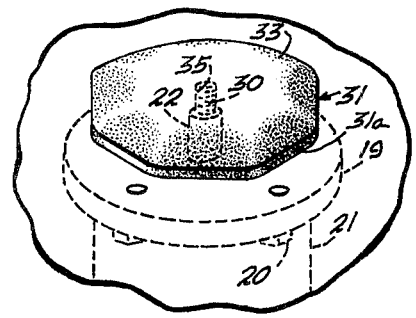
FIG. 3 is a fragmentary oblique view of the inside of the housing showing details of the interlocking basket drive member.

As is best illustrated in FIGS. 2 and 3, the motor drive shaft 22 terminates in a reduced diameter threaded portion 30 which is threadingly received a spinner basket drive cap 31. The drive cap 31, which will preferably be integrally cast of metal, is octagonal in shape and merges from a short bottom section 31a having mutually parallel opposite side walls to a comparatively long frustoconical portion 33 the lines of planer surface junction of which are smoothly rounded, as is best illustrated in FIG. 3. The drive cap 31, for weight reduction purposes, may be recessed at the underside, as illustrated at 34 in FIG. 2, but is integrally formed with a central post 35 having an axially internally threaded bore for the screw-in reception of the motor drive shaft 22. In this connection, it is to be noted that the interthreading direction of attachment is opposite to the direction of rotation of the drive motor shaft 22 to prevent loosening during use of the centrifuge.

The spinner basket 12 will preferably be fabricated, such as by molding of a tough synthetic plastic material, and comprises a cylindrical sidewall portion 36 of somewhat lesser diameter than the internal diameter of the cylindrical body member 14 of the housing assembly, and a bottom wall 37. The bottom wall 37 has integrally formed therein a central octagonal recess 38 having a shape complementary with the shape of the drive cap 31 so as to fully receive said drive cap, as illustrated in FIG. 2. The upper end of the spinner basket sidewall 36 is integrally formed with a slightly outwardly-offset peripheral upper end portion 39. As is further illustrated in FIG. 2, the axial length of the spinner basket 36 when seated upon its drive cap 31 within the housing assembly 11 is somewhat shorter in extent than that of the upper end of the cylindrical body member 14 of said housing assembly.

The cover assembly 13 comprises an inner spinner basket cover member 40 and an outer housing cover member 45 separably interconnected to one another in the manner and for the purpose hereinafter more particularly described. The spinner basket cover member 40, which will also preferably be integrally formed of a tough synthetic plastic material, comprises a short, peripheral skirt portion 42 of such diameter as to fit snugly over the outside of the offset peripheral portion 39 at the upper end of the spinner basket 12. The cover member 40 is also formed with a depressed central portion 43 having an axial opening 44 within which is internally molded a bearing member 44a, which will preferably be of a tough synthetic plastic material such as "Delrin".

The housing cover member 45, which may also be integrally formed of a tough synthetic plastic material, has a short peripheral skirt 46 the internal diameter of which is such that it fits snugly over the upper end of the housing assembly cylindrical body member 14.

Means is provided for coaxially journalling the spinner basket cover member 40 with respect to the underside of the housing cover member 45. To this end, the central portion of the housing cover member 45 is provided with inner and outer metal disc members 47 and 48 clamped in place as by rivets 49. The inner metal disc member 47 has welded thereto or integrally formed therewith, a central circular boss 50, which is internally threaded to receive a journal pin 51. As is best illustrated in FIG. 1, the journal pin 51 has a slightly reduced diameter, externally-threaded end portion 52 threadingly receivable in the boss 50 of the cover assembly 13 and an increased-diameter spacer portion 53 at the other end terminating in a wing handle portion 54 facilitating manual screw-threading of the journal pin in the threaded boss 50. As illustrated in FIG. 2, when the spinner basket cover member 40 is journalled with respect to the housing cover member 45 by means of the journal pin 51, and said journal pin is fully seated and tightened within the boss 50, sufficient play remains along the bearing surface portion 55 of said journal pin to prevent binding and to insure free rotation of the spinner basket cover member 40 upon covering the centrifuge for use. In this connection, it is to be noted that the separable journal pin 51 is large enough so as to be readily observed and located if it should accidentally fall into the spinner basket 36 during assembly or disassembly of the parts. Regularly spaced openings 56 and 57 in their respective side and bottom wall of the spinner basket 12 permit drainage of water from centrifuged foodstuff into the housing assembly 11. A short drain pipe 32 communicating with the inside of the housing assembly pan 15 and extending downwardly thereform provides for the drainage of centrifuge water. It will be understood that a flexible conduit can readily be connected to the drain pipe 32 for disposing of the water through a suitable drainage facility.

In use of the centrifuge, it is only required to turn the energizing switch lever 27 from "off" to "on" position, whereupon the spinner basket 12 together with the contained wet salad or other food to be dried in preparation, will be rotated together with the spinner basket cover member 40 at a speed of between 350 to 550 RPM to centrifuge most of the moisture from the salad greens or other foodstuff. The degree of moisture or dampness desired in the centrifuged product can readily be achieved by controlling the length of time of centrifuging.

An important advantage of the invention resides in the fact that the spinner basket 12 can be used independently of the centrifuge for the storage, transport and washing of foodstuffs prior to and after centrifuging. The spinner basket cover member 40, being readily separable from the cover assembly 13 as described above, can be used independently as a cover for enclosing the spinner basket when used for such purposes. It is thus contemplated that the centrifuge will be supplied with a plurality of extra spinner baskets 12 for sequential use in centrifuging while being serviceable at other times for containing foodstuff for washing, refrigeration, transport or storage before and after centrifuging, as may be appropriate. In this connection, it is also to be noted that the bottom of the spinner basket 12 is substantially flat, so as to seat squarely on a table, shelf or transport cart while being used independently of the centrifuge proper.

Another important advantage of the invention resides in the design of the spinner basket coupling mechanism comprising the octagonal drive cap 31 and the complemental recess 38 in the spinner basket 12, whereby drop-in rotative driving interconnection is achieved without difficulty. The use of mutually journalled inner and outer cover members for the spinner basket and centrifuge housing, moreover, even further simplifies use and operation of the centrifuge.

While I have illustrated and described herein only one form in which my invention can conveniently be embodied in practice, it is to be understood that this form is to be presented by way of example only and not in a lifting sense. My invention, in brief, comprises all the embodiments and modifications coming within the scope and spirit of the following claims:

What I claim as new and desire to secure by Letters Patent is:

1. A centrifuge for drying salad greens and the like, comprising, in combination, a vertically-extending, hollow cylindrical body member having a bottom wall at its lower end and being open at its upper end, a cylindrical spinner basket coaxially receivable within said hollow cylindrical housing member, drive means secured with respect to the underside of said bottom wall of said cylindrical housing member and having a rotary drive shaft extending vertically upwardly through an opening in said bottom wall, means for releasably interconnecting said drive shaft with the bottom wall of said spinner basket for rotating said spinner basket in unison with said drive shaft, a removable cover for said spinner basket for covering the upper end thereof, a removable cover for said cylindrical housing member for covering the upper end thereof, mechanism coaxially journalling said spinner basket cover with respect to said housing member cover to permit rotation of said spinner basket cover independently of said housing member cover, said basket cover and said housing cover each having downwardly projecting peripheral skirt portions adapted to snugly embrace upper marginal end portions at the outsides of said spinner basket and said housing member, respectively, and drainage openings in said spinner basket and said cylindrical body member bottom walls for draining centrifuged water to the outside, said drive shaft interconnecting means comprising an octagonal drive cap secured to the upper end of said drive shaft, and a complementary octagonal recess in the bottom wall of said spinner basket, said octagonal drive cap being integrally formed and comprising a bottom section having mutually parallel opposite side walls and a comparatively long frustoconical portion merging therewith the lines of planar surface junction of which are smoothly rounded.

2. A centrifuge for drying salad greens and the like, comprising, in combination, a vertically-extending, hollow cylindrical body member having a bottom wall at its lower end and being open at its upper end, a plurality of cylindrical spinner baskets coaxially receivable, one at a time, selectively, within said hollow cylindrical housing member, drive means secured with respect to the underside of said bottom wall of said cylindrical housing member and having a rotary drive shaft extending vertically upwardly through an opening in said bottom wall, means for releasably interconnecting said drive shaft with the bottom wall of one at a time, selectively, of said spinner baskets for rotating a selected spinner basket in unison with said drive shaft, a removable cover for each of said spinner baskets for covering the respective upper ends thereof, a removable cover for said cylindrical housing member for covering the upper end thereof, manually operable mechanism for coaxially journalling a selected spinner basket cover with respect to said housing member cover to permit rotation of said selected spinner basket cover independently of said housing member cover, said basket covers and said housing cover all having downwardly projecting peripheral skirt portions adapted to snugly embrace upper marginal end portions at the outsides of said spinner baskets and said housing member, respectively, and drainage openings in said spinner baskets and said cylindrical body member bottom walls for draining centrifuged water to the outside.

3. A centrifuge as defined in claim 2 wherein said mechanism coaxially journalling said spinner basket covers with respect to said housing member cover comprises an internally-threaded boss secured centrally to the underside of said housing member cover, a bearing member fitted in a central opening in each of said spinner basket covers and coaxial therewith, and a journal pin receivable through said bearing member and having an externally-threaded portion at one end for removable attachment to said internally-threaded boss and handle means at the other end for manually attaching and removing said journal pin with respect to said internally-threaded boss.

4. A centrifuge as defined in claim 3 including means for portably supporting said cylindrical body member above a horizontal surface.

5. A centrifuge as defined in claim 4 wherein said means for portably supporting said cylindrical body member comprises a plurality of right-angular, downwardly-projecting legs terminating in castor wheels.

6. A centrifuge as defined in claim 2 wherein said drive shaft interconnecting means comprises an octagonal drive cap secured to the upper end of said drive shaft, a complementary octagonal recess in the bottom wall of each of said spinner baskets, said octagonal drive cap being integrally formed and comprising a bottom section having mutually parallel opposite side walls and a comparatively long frusto-conical portion merging therewith and the lines of planar surface junction of which are smoothly rounded, and wherein said mechanism coaxially journalling said spinner basket covers with respect to the housing member cover comprises an internally-threaded boss secured centrally to the underside of said housing member cover, a bearing member fitted in a central opening in said spinner basket cover and coaxial therewith, and a journal pin receivable through said bearing member and having an externally-threaded portion at one end for removable attachment to said internally-threaded boss and handle means at the other end for manually attaching and removing said journal pin with respect to said internally-threaded boss.

7. A centrifuge as defined in claim 2 and further comprising a short tubular member secured to and extending upwardly of said rotary drive shaft opening in said cylindrical body member bottom wall in surrounding relation with respect to the peripheral edge of said cylindrical housing member bottom wall opening, and a short length of plastic tubing spaced between the outer periphery of said drive shaft and inner wall of said tubular member.

* * * * *